US009740767B2

(12) United States Patent
Quinion et al.

(10) Patent No.: US 9,740,767 B2
(45) Date of Patent: Aug. 22, 2017

(54) SYSTEMS AND METHODS FOR ANALYZING FAILED AND SUCCESSFUL SEARCH QUERIES

(71) Applicant: MapQuest, Inc., Denver, CO (US)

(72) Inventors: Brian Quinion, Sheffield (GB); Stephen Hess, Red Lion, PA (US); Antony Pegg, East Petersburg, PA (US)

(73) Assignee: Mapquest, Inc., Denver, CO (US)

( * ) Notice: Subject to any disclaimer, the term of this patent is extended or adjusted under 35 U.S.C. 154(b) by 733 days.

(21) Appl. No.: 13/841,764

(22) Filed: Mar. 15, 2013

(65) Prior Publication Data
US 2014/0280285 A1 Sep. 18, 2014

(51) Int. Cl.
G06F 17/30 (2006.01)

(52) U.S. Cl.
CPC .. *G06F 17/30646* (2013.01); *G06F 17/30864* (2013.01)

(58) Field of Classification Search
CPC .................................................. G06F 17/30646
USPC .......................................................... 707/766
See application file for complete search history.

(56) References Cited

U.S. PATENT DOCUMENTS

| | | | |
|---|---|---|---|
| 5,640,553 A * | 6/1997 | Schultz | |
| 6,144,958 A * | 11/2000 | Ortega et al. | |
| 6,401,084 B1 * | 6/2002 | Ortega et al. | 707/706 |
| 6,470,347 B1 * | 10/2002 | Gillam | |
| 6,772,150 B1 | 8/2004 | Whitman et al. | |
| 7,254,774 B2 * | 8/2007 | Cucerzan et al. | 715/257 |
| 7,716,229 B1 * | 5/2010 | Srivastava et al. | 707/749 |
| 2004/0002994 A1 * | 1/2004 | Brill et al. | 707/104.1 |
| 2005/0210383 A1 * | 9/2005 | Cucerzan et al. | 715/533 |
| 2007/0016616 A1 * | 1/2007 | Brill et al. | 707/104.1 |
| 2007/0038615 A1 * | 2/2007 | Vadon et al. | 707/4 |
| 2009/0164890 A1 * | 6/2009 | Zhu et al. | 715/257 |
| 2012/0066195 A1 * | 3/2012 | Lee et al. | 707/706 |
| 2013/0124492 A1 * | 5/2013 | Gao et al. | 707/706 |

FOREIGN PATENT DOCUMENTS

WO WO 00/04465 A1 1/2000

OTHER PUBLICATIONS

Ahmad, Farooq, et al., "Learning a Spelling Error Model from Search Query Logs", HLT/EMNLP, Vancouver, British Columbia, Canada, © 2005, pp. 955-962.*

Duan, Huizhong, et al., "Online Spelling Correction for Query Completion", WWW 2011, Hyderabad, India, Mar. 28-Apr. 1, 2011, pp. 117-126.*

(Continued)

*Primary Examiner* — R. Stevens

(57) ABSTRACT

Computerized systems and methods are provided for analyzing failed and successful search queries. In accordance with some embodiments, search records with character strings that are refinements of character strings of other search records are deemed related as belonging to a same user search. Minimum changed sections between character strings in related search records are determined. Correction pairs are created including the character sequences from the portions of the character strings containing the minimum changed sections. Frequencies of correction pairs in a pool of correction pairs are calculated, and the correction pairs appearing in the pool most frequently are stored in a correction log.

17 Claims, 9 Drawing Sheets

(56) References Cited

OTHER PUBLICATIONS

Gao, Jianfeng, et al., "A Large Scale Ranker-Based System for Search Query Spelling Correction", Coling 2010, Beijing, China, Aug. 2010, pp. 358-366.*

Li, Mu, et al., "Exploring Distributional Similarity Based Models for Query Spelling Correction", Proc. of the 21st International Conf. on Computational Linguistics and 44th Annual Meeting of the ACL, Sydney, Australia, Jul. 2006, pp. 1025-1032.*

Martins, Bruno, et al., "Spelling Correction for Search Engine Queries", EsTAL 2004, LNAI 3230, Springer-Verlag, Berlin, Germany, © 2004, pp. 372-383.*

Sun, Xu, et al., "Learning Phrase-Based Spelling Error Models from Clickthrough Data", Proc. of the 48th Annual Meeting of the Ass'n for Computational Linguistics, Uppsala, Sweden, Jul. 11-16, 2010, pp. 266-274.*

Whitelaw, Casey, et al., "Using the Web for Language Independent Spellchecking and Autocorrection", Proc. of the 2009 Conf. on Empirical Methods in Natural Language Processing, Singapore, Aug. 6-7, 2009, pp. 890-899.*

Lu, Yifei, et al., "XClean: Providing Valid Spelling Suggestions for XML Keyword Queries", ICDE 2011, Hannover, Germany, Apr. 11-16, 2011, pp. 661-672.*

Microsoft Computer Dictionary, 5th Edition, Microsoft Press, Redmond, WA. © 2002 Microsoft Corp., p. 510.*

John. W. Wilbur, et al., "Spelling correction in the PubMed search engine," Information Retrieval, Kluwer Academic Publishers, vol. 9, No. 5, pp. 543-564 (Sep. 1, 2006).

Rosie Jones et. al., "Generating query substitutions," In Proceedings of the $15^{th}$ International Conference on World Wide Web, pp. 387-396 (May 23, 2006).

International Search Report and Written Opinion for International Application No. PCT/US2014/022421, mailed Jul. 24, 2014 (9 pages).

\* cited by examiner

400

Saturday, Mar-09-2013 10:20:38
User Identifier = 59161178121
Query = bike leasing Lancaster pa
Returned results = 0

Saturday, Mar-09-2013 10:22:45
User Identifier = 59161178121
Query = bike rentals Lancaster pa
Returned results = 8

401 — Saturday, Mar-09-2013 8:32:14
User Identifier = 61938210183
Query = Hiton Head NC
Returned results = 0

402 — Saturday, Mar-09-2013 8:33:01
User Identifier = 61938210183
Query = Hilton Head NC
Returned results = 1

403 — Saturday, Mar-09-2013 8:33:46
User Identifier = 61938210183
Query = Hilton Head SC
Returned results = 78

Saturday, Mar-09-2013 3:52:23
User Identifier = 89277546003
Query = pizza dayton oh
Returned results = 31

SYSTEMS AND METHODS FOR ANALYZING FAILED AND SUCCESSFUL SEARCH QUERIES

BACKGROUND

Technical Field

The present disclosure relates to computerized data processing and search technologies. More particularly, and without limitation, the present disclosure relates to systems and methods for analyzing failed and successful search queries, and techniques to refine future search queries.

Background

Use of the Internet has grown significantly in recent years. Internet access is now available from a variety of devices, such as personal computers, laptops, tablets, personal digital assistants (PDAs), mobile phones, smart-phones, televisions, and other devices. With the increased access to the Internet from a wide variety of devices, people have become more reliant than ever on online search engines to submit queries and find desired information.

Web sites offer a variety of different search engines for finding desired information from a large pool of available information. Both generalized search engines and specialized search engines are available. For example, Google™ and Bing™ provide web sites for conducting generalized web searches. Specialized search engines are available for searching within particular content categories. For example, search engines are available for searching for news, products, jobs, events, entertainment, legal information, medical information, geographic or map information, recipes, people, friends, real estate, and much more. There are also specialized search engines for searching for particular types of content. For example, search engines are available for searching for audio files, video files, local content, and other types of specific information or content.

There are a variety of different ways in which search engines allow users to enter queries. Some search engines provide separate fields or codes, allowing a user to designate a particular query term or phrase as relating to a particular type of information. For example, a bookseller may provide a search allowing a user to search through only book titles or author names for a particular term. Other search engines provide a field for entering a search query in a natural language format, and analyze the query in an attempt to determine the user's meaning before conducting the search. Such an analysis may involve separating the query into words, and attempting to derive a context from the ordering of the words in the query.

The prevalence of Internet access and the availability of a wide variety of online search engines make it easier for people to discover answers to their questions and find information. Nevertheless, it can still be difficult for users to find desired information. Users may misspell terms, or search for certain terms or phrases when other terms or phrases would be yield more successful results. For example, a user may search for a particular term when a synonym of that term would provide more pertinent results. As a result, a user may enter a search query only to find that the returned results do not contain the desired information. At that point, users often enter a new search query and try again. The new search query is often a refinement of the old search query. For example, a user may correct a misspelling, or replace a term with a synonym. A user often refines their search multiple times before a result set is returned that contains the desired information. This can be a tedious process given the amount of available information the user must search through on the Internet.

Certain search engines have attempted to solve this problem by providing users with suggestions if an initial search does not provide desired results. These suggestions may contain related terms generated on the basis of the initially returned result set. However, these related terms are often of little use in refining a search. Such a technique also requires a user to go through a search refinement process, which can be tedious and time consuming.

SUMMARY

Embodiments of the present disclosure provide improved systems and methods for analyzing failed and successful search queries. Embodiments of the present disclosure also encompass techniques to refine future search queries. The embodiments presented herein also address one or more of the disadvantages of conventional systems and methods, such as those highlighted above.

In accordance with the present disclosure, there is provided a computer-implemented method for identifying failed and successful search queries. The method comprises retrieving, from a storage device, a first record including a first character string, retrieving a second record including a second character string, and determining, with at least one processor, that the second character string is a refinement attempted by a user of the first character string. The method further comprises identifying at least a first sequence of characters of the first character string that differs from at least a second sequence of characters of the second character string and storing the first sequence of characters and the second sequence of characters as a pair in a database of stored pairs.

Also in accordance with the present disclosure, there is provided a computer-implemented system for identifying failed and successful search queries, comprising a memory device that stores a set of instructions and at least one processor that executes the set of instructions. The at least one processor is configured to retrieve a first record including a first character string, retrieve a second record including a second character string, and determine that the second character string is a refinement attempted by a user of the first character string. The at least one processor, when executing the instructions, is also configured to identify at least a first sequence of characters of the first character string that differs from at least a second sequence of characters of the second character string and store the first sequence of characters and the second sequence of characters as a pair in a database of stored pairs.

Further in accordance with the present disclosure, there is provided a non-transitory computer-readable medium stores a set of instructions that are executable by at least one processor to cause the at least one processor to carry out a method. The method comprises retrieving a first record including a first character string, retrieving a second record including a second character string, and determining that the second character string is a refinement attempted by a user of the first character string. The method also comprises identifying at least a first sequence of characters of the first character string that differs from at least a second sequence of characters of the second character string and storing the first sequence of characters and the second sequence of characters as a pair in a database of stored pairs.

Before explaining exemplary embodiments of the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 4 illustrates an exemplary query log, consistent with embodiments of the present disclosure.

DETAILED DESCRIPTION OF EXEMPLARY EMBODIMENTS

Figure 1:
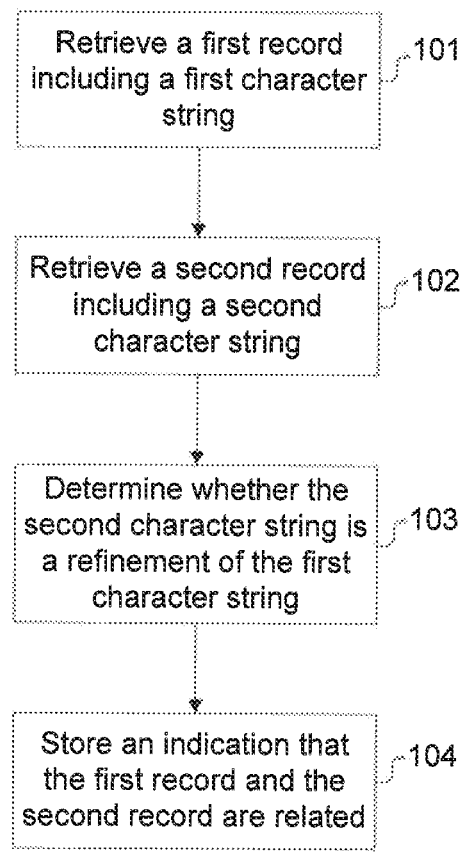
FIG. 1 illustrates an exemplary method for determining whether search records are related, consistent with embodiments of the present disclosure.

Reference will now be made in detail to the present embodiments of the disclosure, certain examples of which are illustrated in the accompanying drawings.

Embodiments of the present disclosure encompass computer-implemented systems and methods that provide search correction features through analysis of a history of queries previously submitted to a search engine. Such systems and methods may retrieve a log of past search queries and identify refinements of prior search attempts. Based on the prior search attempts and the refinements, a search provider may successfully refine future search attempts.

Embodiments of the present disclosure also encompass computer implemented systems and methods that can address the problems of conventional online search services and techniques by identifying failed search terms and phrases commonly entered by users, and successful refinements of the failed search terms and phrases. With this information, search providers can automatically refine future search attempts, and/or provide users with optional refinements of search terms or phrases. Furthermore, systems and methods consistent with the present disclosure may provide increased customer satisfaction of a search provider's services, which may stimulate additional use of these search services. This may result in higher revenue for the search provider through, for example, additional sales of online advertising associated with the search services.

In accordance with embodiments described herein, a search provider may provide one or more web servers including a search engine for processing user search queries received over a network, such as the Internet. A search query may include one or more terms or phrases submitted by a user to search an available pool of information indexed by the web server. The web server(s) may store search records within a query log. Search records may record character strings representing search queries.

A character string may include a sequence of characters. The sequence of characters may include one or more alphanumeric characters, accented characters, diacritics, spaces, character returns, punctuation, and/or any other character commonly entered by a user with a keyboard and/or provided for in a character-encoding scheme, such as American Standard Code for Information Interchange (ASCII) or UCS Transformation Format-8-bit (UTF-8). A character string may include one or more query terms entered by a user. For example, a character string may include one or more words, phrases, abbreviations, or numbers.

Search records may also record indications of times when queries were submitted. An indication of time may include a timestamp. For example, a clock or other timer at the web server may record timestamps indicating times when queries were performed. A timestamp may include one or more of a time of day, day of week, month, or year, though it will be appreciated that any other known indication of time could be used.

Search records may also record identifiers associated with the queries. An identifier may be a session identifier. For example, upon opening a website with a search field, an access session may be initiated between the web server and the client device accessing the website. A session identifier, such as a session token, associated with the access session may be recorded in a search record. Alternatively, an identifier may be a user identifier. For example, a user may be required to login when accessing a website, and the login name may be recorded in a search record.

Search records may also record other information that may be used in analysis of past search queries. For example, search records may include an indication of a number of search results returned as a result of a query, or a universal resource link (URL) of a website from which the search was initiated.

FIG. 1 illustrates an exemplary method 100, consistent with embodiments of the present disclosure. In step 101, a first record is retrieved. The first record may be indicative of a prior first search attempt, and may be retrieved from a query log of prior search attempts. The first record may include, for example, a first character string, a first identifier, an indication of a first time, and/or an indication of a number of results returned from the first search attempt. The first character string may be a query string of one or more query terms that a user entered during the first search attempt. The first identifier may identify the user's search session with a session identifier or a user identifier. The indication of a first time may indicate a time when the first search attempt was conducted.

In step 102, a second record may be retrieved. The second record may be indicative of a prior second search attempt, and may also be retrieved from the query log of prior search attempts. The second record may include, for example, a second character string, a second identifier, an indication of a second time, and/or an indication of a number of search results returned from the second search attempt. The second character string may be a query string of one or more query terms that a user entered during the second search attempt. The second identifier may identify the user's search session with a session identifier or a user identifier. The indication of a second time may indicate a time when the second search attempt was conducted.

The second record may be selected for retrieval from the search query log based on a determination that the second time is after the first time. The second record may also be retrieved based on a determination that the first identifier matches the second identifier. For example, the second record may be selected based on a determination that the first record and the second record represent searches conducted in the same user search session, and that the second record represents a search that was conducted after the search represented by the first record was conducted.

While the above description describes retrieving the first record in step 101 and the second record in step 102, the description is not so limited. It will be appreciated that the second record may be retrieved in step 101, and the first record may be retrieved in step 102. In such a case, the first record may be selected based on a determination that the first time is prior to the second time.

In step 103, the first record and the second record may be compared to determine whether the second character string is a refinement of the first character string. An exemplary embodiment of step 103 is further described below with reference to method 200 of FIG. 2.

Figure 2:
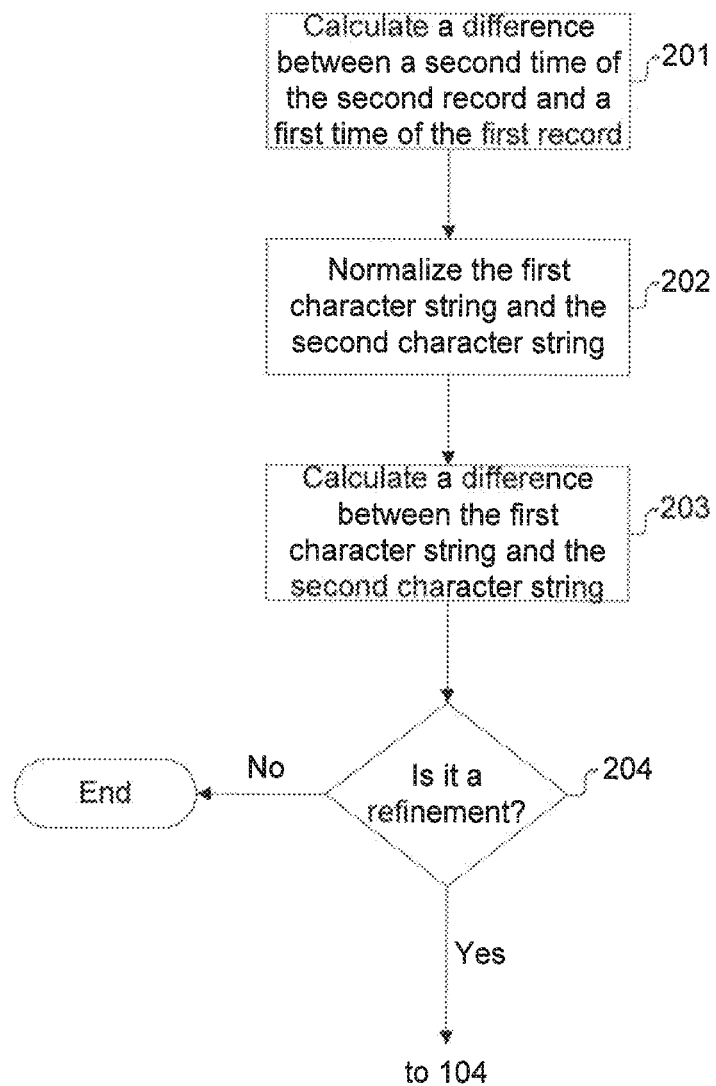
FIG. 2 illustrates an exemplary method for determining whether a character string is a refinement of another character string, consistent with embodiments of the present disclosure.

FIG. 2 illustrates an exemplary method 200, consistent with embodiments of the present disclosure. Method 200 may be utilized to determine whether the second character string is a refinement of the first character string.

In step 201, a difference between the second time and the first time may be calculated. This difference may be calculated by subtracting the first time from the second time, though the disclosure is not so limited.

In step 202, the first character string and the second character string may be normalized into a standard format. This may involve one of more of, for example, capitalizing a first character of one or more words, removing punctuation, removing one or more spaces between words, removing one or more character accents or diacritics, and normalizing standard terms (e.g., Street→St, Saint→St). A character string such as "pizza, reston?" may be normalized to "Pizza Reston", for example. Normalizing the character strings may make it easier for the system to compare the character strings, as further described below.

In step 203, a difference between the first character string and the second character string may be calculated. This may be calculated using, for example, a Levenshtein distance metric. Levenshtein distance is a string-matching metric for measuring the difference between two character strings. A Levenshtein distance between two character strings is the minimum number of edits needed to transform one string into the other, with the only allowable edit operations being a character insertion, deletion, or substitution. The difference between the first character string and the second character string may also be calculated based on a difference between a length of the first character string and a length of the second character string. Once the difference between the first character string and the second character string is calculated, the method may proceed to step 204.

In step 204, it is determined whether the second character string is a refinement of the first character string based on an evaluation of the time difference calculated in step 201 and the difference calculated in step 203. For example, a greater time difference may indicate a lesser chance of the second character string being a refinement of the first character string. A greater Levenshtein distance may also indicate a lesser chance of the second character string being a refinement of the first character string. In some embodiments, weights may be associated with the time difference and the Levenshtein distance. The relationship between the first and second records may then be scored based on the combination of the time difference and the Levenshtein distance. Then, it may be determined whether the second character string is a refinement of the first character string based on whether the score satisfies a predetermined threshold.

If it is determined that the second character string is not a refinement of the first character string, the method may end. If it is determined that the second character string is a refinement of the first character string, the method may proceed to step 104. In step 104, an indication that the first record and second record are related may be stored.

Figure 3:
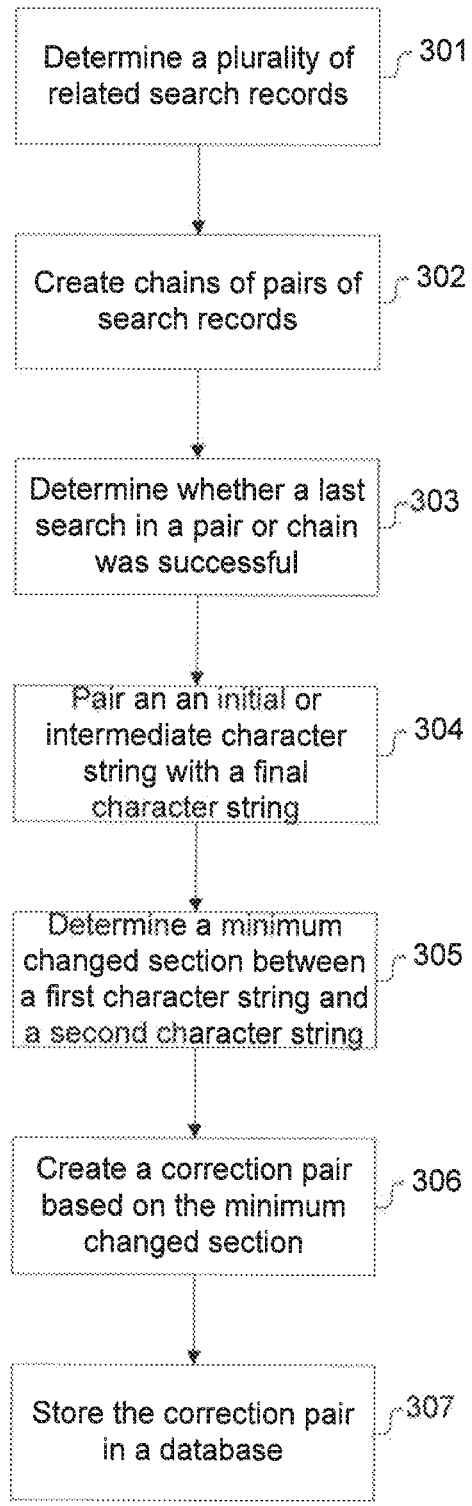
FIG. 3 illustrates an exemplary method for identifying pairs of corrected terms or phrases, consistent with embodiments of the present disclosure.

FIG. 3 illustrates another exemplary method 300, consistent with embodiments of the present disclosure. In step 301, a plurality of related search records may be identified from the query log by repeatedly performing method 100 (FIG. 1) for pairs of search records in the query log. For example, pairs of search records may be compared until all of the search records in the query log have been compared. In one embodiment, the query log may be sorted according to identifier, and pairs of search records may be compared until all of the search records associated with the identifier in the query log have been compared. In this manner, all of the search records of a user from a query log may be compared, and indications of a user's related search records may be stored. In another embodiment, the query log may be sorted according to the indications of time, and pairs of search records indicating sequential search times may be compared. The query log may store records of a single user or a plurality of users, and may be updated on a regular basis, such as daily, weekly, or monthly.

FIG. 4 illustrates an exemplary query log 400 that may store a plurality of search records, consistent with embodiments of the present disclosure. Method 100 of FIG. 1 may be performed on records 401 and 402, for example, which represent searches conducted by the same user. Method 100 may determine that records 401 and 402 are related. Method 100 may then be performed on records 402 and 403, which also represent searches conducted by the same user. Method 100 may determine that records 402 and 403 are also related. Method 100 may also be performed on records 401 and 403, and method 100 may determine that records 401 and 403 are also related.

Referring again to FIG. 3, in step 302, chains of the pairs of related records may be created by identifying groups of the pairs of records that are probable refinements of the same search. This may be accomplished by comparing a character string of a second sequential record in a first pair of related records with a character string of a first sequential record in a second pair of related records. For example, in the exemplary query log of FIG. 4, records 401 and 402 may represent a first pair of sequential records, and records 402 and 403 may represent a second pair of sequential records. In this case, the character string of the second sequential record in the first pair of records and the character string of the first sequential record in the second pair of records are both "Hilton Head NC". Thus, a chain of pairs may be created by storing an indication that the first pair of related records and the second pair of related records are a chain of paired records. This may be performed, for example, for all of a user's search records in a query log. Thus, by identifying pairs of related search records, and chains of three or more related search records, search records may be grouped from a query log that are likely to be refinements of the same search. Once related records are paired and/or chained together, the method may proceed to step 303.

In step 303, it is determined whether a last search record in a chain or pair of search records represents a final successful result of the series of attempted searches. The last search record may be identified by determining which search record in a chain or pair of search records contains the latest identification of when the search was performed. Then, it may be determined whether the character string of the last search record was a successful query. For example, it may be determined that a period of time has passed between when the query of the last search record was executed by a user, and when a next query was executed by the user. If a long period of time has elapsed, this may indicate that the query of the last search record was successful. A number of results may be determined that were returned from the query of the last search record. If the number of results is zero, or the determined period of time is not longer than a predetermined threshold, it may be determined that the last search record does not indicate a successful search. This may be representative of a situation where a user attempted a number of searches, and eventually gave up. The system may also take user interaction into account in determining whether the last search record was successful. For example, a user may interact with a search result in a way that indicates that he/she is pleased or disappointed with the search results. When the last search record of a pair or chain of search records does not indicate a successful search, the entire pair or chain may be discarded. Once the pairs and chains of search records with final successful results are determined, the method may proceed to step 304.

In step 304, pairs of character strings may created between character strings indicated by initial or intermediate search records in a chain or pair of search records, and the character string that resulted in a final successful search. For example, in the exemplary query log of FIG. 4, the character string "Hiton Head NC" of search record 401 may be paired with the character string "Hilton Head SC" of search record 403, and the character string "Hilton Head NC" of search record 402 may also be paired with the character string "Hilton Head SC" of search record 403. Once the character strings from the initial and intermediate records in the pairs or chains of search records are paired with the character strings of the final successful records, the method may proceed to step 305.

As noted above, a Levenshtein distance is a string-matching metric for measuring the difference between two character strings. A Levenshtein distance between two character strings is the minimum number of edits needed to transform one string into the other, with the only allowable edit operations being a character insertion, deletion, or substitution. However, in refining search queries, users often delete, add, substitute, or reorder entire terms. In these situations, a Levenshtein distance calculation will count edits for each character of the inserted, deleted, substituted, or reordered term. As a result, if a normal Levenshtein distance calculation is used to compare the similarity between two search queries, a term that is inserted, deleted, substituted, or reordered may overemphasize the dissimilarity between the two queries. A modified, "substring based" Levenshtein distance metric may be used to reduce this overemphasis.

In the modified, "substring based" Levenshtein approach, allowable edit operations may include insertion, deletion, or substitution of entire terms in a character string, rather than insertion, deletion, or substitution of individual characters as in a normal Levenshtein approach. That is, if a sequence of terms in a first character string included "Bicycles", "Hilton", "Head", and "SC", and a sequence of terms in a second character string included "Hilton", "Head", and "SC", a "substring based" approach may determine that the minimum number of substring edits is one (the removal of "Bicycles"). Similarly, if a first sequence of terms in a first character string included "Bikes", "Hilton", "Head", and "SC", and a sequence of terms in a second character string included "Bicycles", "Hilton", "Head", and "SC", a "substring based" approach may determine that the minimum number of substring edits is one (the substitution of "Bicycles" for "Bikes"). Thus, a "substring based" approach may be used to calculate a minimum number of term edits needed to transform a first sequence of terms into a second sequence of terms.

The sequence of terms in a character string may be determined in a variety of different ways. For example, some programming languages, such as PHP, provide for easy determination of terms from a character string. Alternatively, a character string may be broken into sequences of terms by tokenizing the character string based on a predetermined character delimiter, such as a space. Once the sequence of terms in the two paired character strings have been determined, the method may proceed to step 305.

In step 305 a modified, "substring based" Levenshtein distance calculation may be used to determine a minimum changed section of a character string between an initial or intermediate character string and a character string of a final successful record. That is, as noted above, a Levenshtein distance calculation can be performed between two character strings using insertion, deletion, or substitution of terms as the only allowable edits rather than insertion, deletion, or substitution of characters. The result is a minimum number of term, or "substring" edits between the character strings. However, the minimum number of substring edits is more of a byproduct of the implementation disclosed herein, as will be further discussed below.

Normal Levenshtein distances may be calculated using a dynamic programming approach. For example, a matrix (m, n) may be initialized for a first character string with a length of m characters, and a second character string with a length of n characters. Then, as known in the normal Levenshtein approach, the matrix may be filled from the upper left corner to the lower right corner, where each (i, j) cell in matrix (m, n) stores a Levenshtein distance between the i-character prefix of the first character string and the j-character prefix of the second character string. For example, in a normal Levenshtein approach, a cell of (i=2, j=4) would store a Levenshtein distance between the first two characters of a first character string and the first four characters of a second character string. In a modified, "substring based" Levenshtein approach, matrix (m, n) may by initialized for a first character string with a length of m substrings (i.e, terms or phrases), and for a second character string with a length of n substrings (i.e., terms or phrases). Then, the matrix may be filled from the upper left corner to the lower right corner, where each (i, j) cell in matrix (m, n) stores a Levenshtein distance between the i-substring prefix of the first character string and the j-substring prefix of the second character string. For example, in a "substring" based Levenshtein approach, a cell of (i=2, j=4) would store a Levenshtein distance between two substrings of a first character string and the first four substrings of a second character string.

Figure 9:
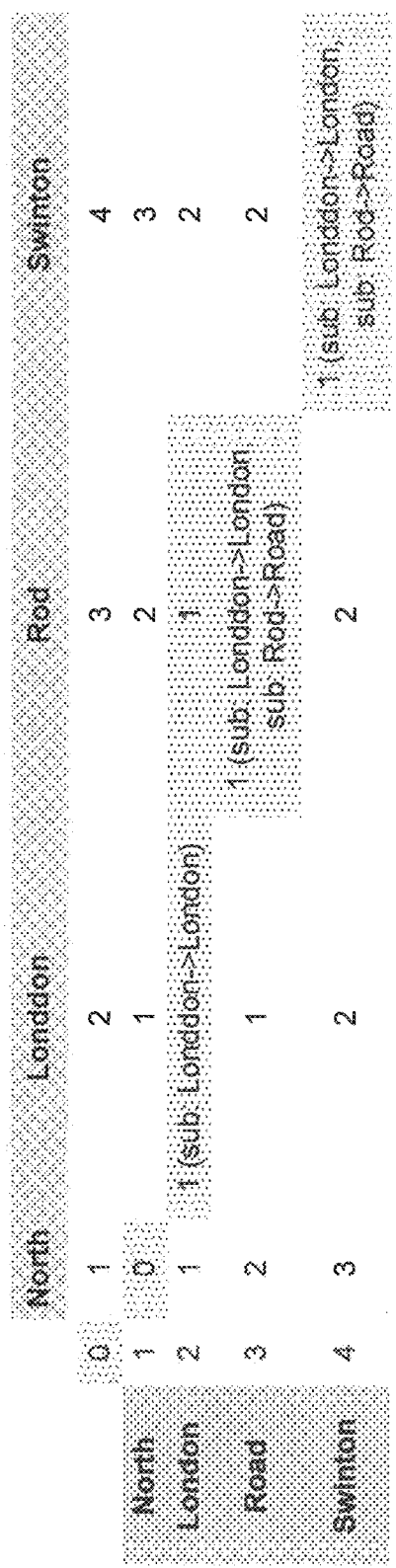
FIG. 9 illustrates an exemplary matrix formed from a "substring based" Levenshtein calculation, consistent with embodiments of the present disclosure.

FIG. 9 illustrates an exemplary matrix formed from a "substring based" Levenshtein approach comparing a first character string "North Londdon Rod Swinton" with a second character string "North London Road Swinton". As illustrated in FIG. 9, each cell in the matrix may store a Levenshtein distance between the substring prefix of the first character string and the substring prefix of the second character string. The grayed cells of FIG. 9 indicate the minimum edit operations to convert the substring prefix of the first character string with the substring prefix of the second character string.

Embodiments of the present disclosure may track the operations performed for each cell as the matrix is filled with the Levenshtein distances, and may store these operations in a list. This list may then be used to identify a portion of the character string for which a minimal number of operations is required. For example, if the first character string was "The Cty Of London" and the second character string was "The City of London", the system may determine the minimal operations to be replacing the term "Cty" with "City". Alternatively, the system may determine the portion with the minimal operations to be a multiple word change. For example, if the first character string was "The Cty of London" and the second character string was "The City London", the minimal operations may include replacing "Cty Of" with the term "City". As another example, if the first character string was "The Of City London" and the second character string was "The City Of London", the minimal operations may include replacing "Of City" with "City Of". The minimal operations may also include removal or addition of terms or phrases. For example, if the first character string was "The City Of London" and the second character string was "The City London", the minimal operations include replacing "Of" with " ".

In step 306, a correction pair may be created based on the minimal operations. For instance, applying the "substring based" Levenshtein approach to a first character string "The Cty of London" and a second character string "The City Of London" may result in a correction pair "Cty"=>"City". As another example, applying the "substring based" Levenshtein approach to a first character string "The Cty Of London" and a second character string "The City London" may result in a correction pair "Cty Of"=>"City". One correction pair may be created for each application of the "substring based" Levenshtein approach to two character strings, though the disclosure is not so limited. Any other term or phrase substitutions, additions, or removals indicated in the operations list or graph may be discarded. Alternatively, other term or phrase substitutions, additions, or removals not output as correction pairs may be stored for analysis of term or phrase context or other types of statistical analysis. In step 307, the correction pair identified from a comparison of two character strings may be stored in a database of correction pairs.

Figure 5:
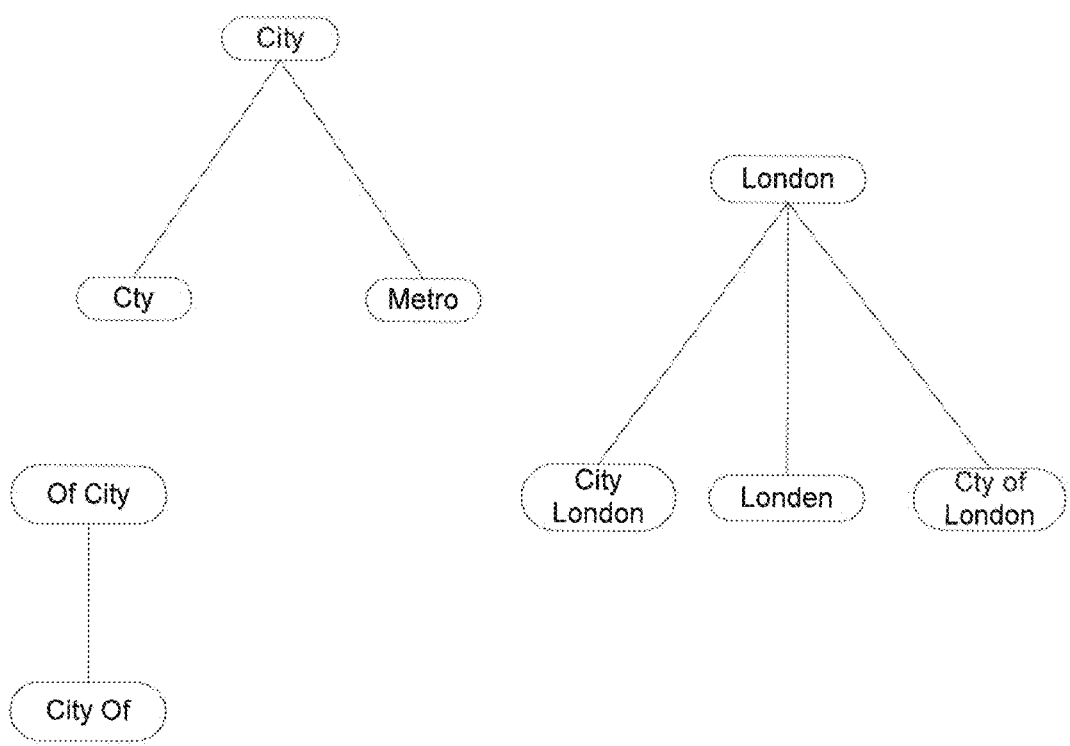
FIG. 5 illustrates an exemplary graph of correction pairs, consistent with embodiments of the present disclosure.

Terms or phrases of correction pairs may be linked with other terms or phrases of other correction pairs. For example, correction pairs may be stored with identifiers identifying links to other correction pairs. Alternatively, the system may search for terms or phrases in correction pairs to dynamically link all of the terms or phrases that are paired in correction pairs with the searched for terms or phrases. Based on identified links between connection pairs, the system may display graphs of correction pairs. FIG. 5 depicts an exemplary graph of correction pairs.

Figure 6:
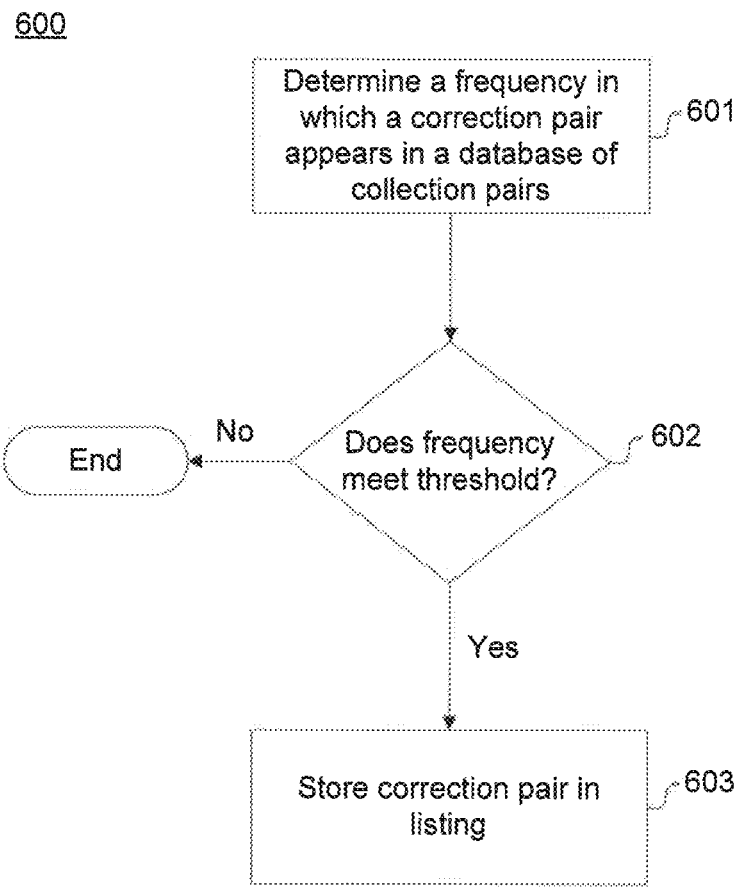
FIG. 6 illustrates an exemplary method for determining whether to store a correction pair in a correction log, consistent with embodiments of the present disclosure.

FIG. 6 illustrates an exemplary method 600 for updating a listing of useful correction pairs. In step 601, the frequency with which a correction pair appears in a database of correction pairs may be determined. In step 602, it may be determined whether the frequency meets a determined threshold frequency value. If the frequency does not meet the determined threshold frequency value, method 600 may end. If the frequency does meet the determined threshold frequency value, method 600 may proceed to step 603. In step 603, the correction pair may be stored in a listing of useful correction pairs. The frequency with which correction pairs appear in the database of correction pairs may be determined automatically on a regular basis or in real-time. Alternatively, an operator may select a particular correction from the database of correction pairs to determine a frequency with which it appears.

Figure 7:
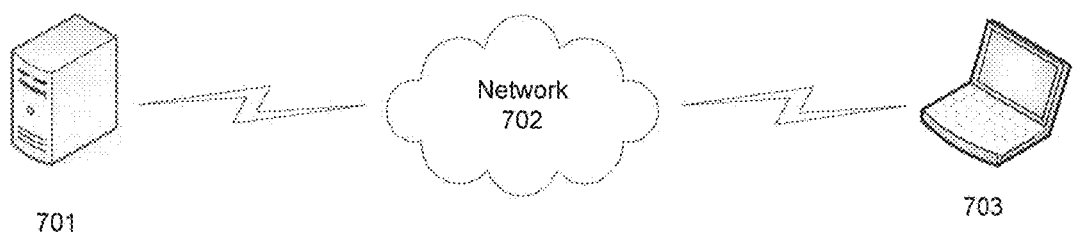
FIG. 7 illustrates an exemplary computing environment for implementing embodiments and features consistent with the present disclosure.

FIG. 7 is a diagram illustrating an exemplary computing environment 700 for implementing embodiments consistent with the present disclosure, including the above-described methods and features. In computing environment 700, a search provider may provide a computer system 701 that enables search services. Computer system 701 may include one or more web servers hosting web pages or software applications that provide for entry of search queries. Computer system 701 may also include back-end servers for processing search queries, or analyzing past search queries.

A network 702 may connect computer system 701 with one or more client devices 703. Network 702 may provide for the exchange of information, such as search queries and results, between client devices 703 and computer system 701. Network 702 may include one or more types of networks interconnecting servers 701 with client devices 703. For example, one of client devices 703 may communicate with a computer system 701 over a coaxial cable network, while a different one of client devices 703 may communicate with computer system 701 over a cellular network. Network 702 may include one or more wide area networks (WANs), metropolitan area networks (MANs), local area networks (LANs), or any combination of these networks. Network 702 may include a combination of a variety of different network types, including Internet, Ethernet, twisted-pair, coaxial cable, fiber optic, cellular, satellite, IEEE 802.11, terrestrial, and/or other types of network connections. In some embodiments, network 702 comprises the Internet.

Client devices 703 may include a variety of different types of computing devices capable of communicating with computer system 701 over network 702. These computing devices may include personal computers, laptops, personal digital assistants (PDA), telephones, televisions, set-top boxes, mobile phones, smart-phones, tablet computers, servers, and/or other types of computing devices. A user may use more than one type of client device to communicate with computer system 701.

Figure 8:
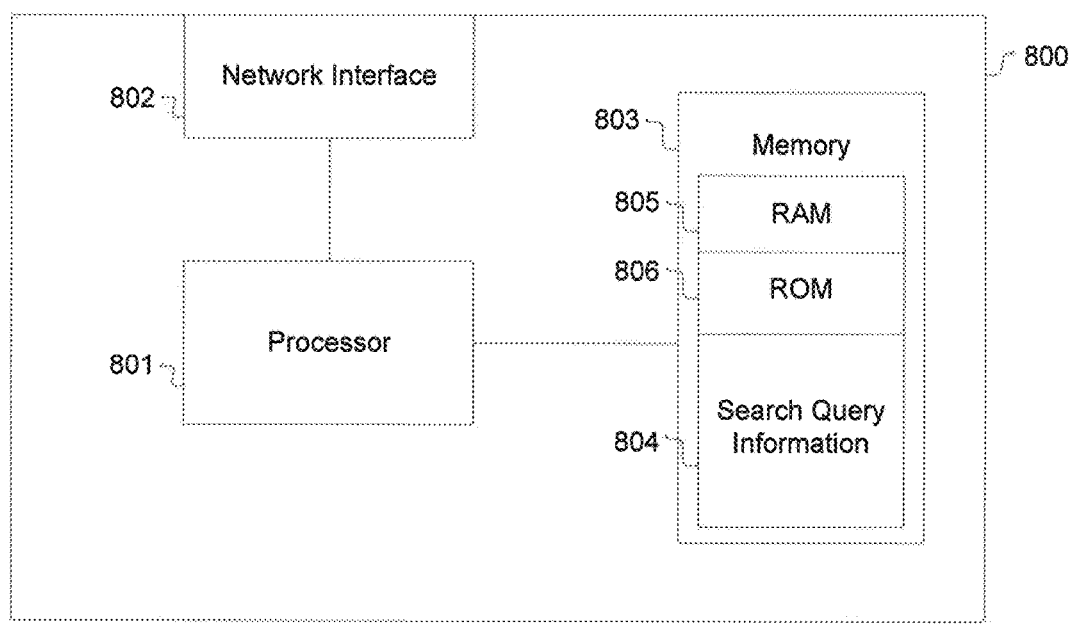
FIG. 8 illustrates an exemplary computer system for implementing embodiments and features consistent with the present disclosure.

FIG. 8 is a diagram illustrating an exemplary computer system 701 that may be used for implementing embodiments consistent with the present disclosure, including the exemplary systems and methods described herein. Computer system 701 may include one or more computers 800, which may be servers, personal computers, and/or other types of computing devices. A computer 800 may include one or more processors 801 that may be any suitable type of processor. Processor 801 may be coupled to a network interface 802 for receiving and/or transmitting data and/or commands to/from other devices over a variety of networks, such as Internet, Ethernet, twisted-pair, coaxial cable, fiber optic, cellular, satellite, IEEE 802.11, terrestrial, or other wired or wireless networks.

Processor 801 may be coupled to a memory device 803. Memory device 803 may be configured to store instructions that, when executed by one or more processors 801, carry out the methods and techniques consistent with the present disclosure, including the exemplary methods and techniques described herein. Memory device 803 may also store an operating system, software applications, and/or parameters. Data stored on memory device 803 may be stored in a single dedicated memory, or over a plurality of memory devices. Memory device 803 may include any type of memory, physical, non-transient, volatile, or non-volatile, including, but not limited to, random access memory (RAM) 805, read-only memory (ROM) 806, magnetic strip storage, semiconductor storage, optical disc storage, and/or magneto-optical disc storage.

Memory device 803 may also include one or more databases 804 for storing search query information, such as search query logs and search records, statistical information regarding search queries, and/or any other information or data stored as a result of the performing the disclosed methods, or required to perform the disclosed methods. For example, databases 804 may store pools of corrected pairs and a log of useful corrected pairs, as disclosed herein. Processor 801 may also be coupled to a computer providing a user interface for allowing input of information and commands to processor 801 and/or for allowing output of information and commands in a human-readable form.

As previously disclosed herein, search query records may be analyzed to collect useful correction pairs of query terms or phrases. These correction pairs may be stored in a log of correction pairs that is regularly updated through performance of the methods disclosed herein. This list of correction pairs may then be used by computer system 701 for a variety of purposes. For example, the log of correction pairs may be input into search algorithms for refining search queries. If a user enters the term "cty" into a search query, for example, the system may automatically determine from the log of correction pairs that a correction pairs exists for the term "cty" and that this term should be corrected to "city." System 701 may automatically change the term on the back-end of the search without requiring the search user's input, and provide the user with search results based on "city" rather than "cty". Alternatively, system 701 may determine that the term "cty" should be corrected to "city," and may send a notification to the search user asking if they would like to change the term "cty" to "city". In still another embodiment, the log of correction pairs may be used in an autocorrect implementation. In this type of embodiment, if a user enters the term "cty" and then hits a space or return, the term may be corrected in the displayed search query field to "city".

Accordingly, the disclosed systems and methods provide a useful way of correcting query terms and phrases to yield more successful results. The embodiments disclosed herein account for user refinements in sequential search queries. Since users are likely to continue to refine searches until desired information is returned, term and phrase corrections identified from a pool of refined searches may be highly likely to yield better search results. Moreover, unlike traditional spell correction technologies, the disclosed embodiments may be continually performed over time. Accordingly, popular terms and phrases may be accounted for, such as popular new musical artists or restaurants.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for identifying failed and successful search queries, comprising:
    retrieving, from a storage device, a first record including a first character string;
    retrieving a second record including a second character string;
    determining, by at least one processor, that the second character string is a refinement attempted by a user of the first character string;
    identifying at least a first sequence of characters of the first character string that differs from at least a second sequence of characters of the second character string;
    storing the first sequence of characters and the second sequence of characters as a pair in a database of stored pairs;
    calculating a frequency with which the pair containing the first sequence of characters and the second sequence of characters appears within the database of stored pairs;
    determining that the frequency exceeds a predetermined frequency threshold; and
    storing the pair in a correction log.

2. The method of claim 1, the first record further including a first identifier and the second record further including a second identifier, wherein determining that the second character string is a refinement of the first character string further comprises determining that the first identifier matches the second identifier.

3. The method of claim 1, the first record further including an indication of a first time and the second record further including an indication of a second time, wherein determining that the second character string is a refinement of the first character string further comprises determining that a difference between the indication of the second time and the indication of the first time is within a predetermined time duration.

4. The method of claim 1, wherein a difference between the second sequence of characters and the first sequence of characters comprises at least one of the following edits:
    an inserted character;
    a deleted character;
    a substituted character;
    an inserted word;
    a deleted word; or
    a substituted word.

5. The method of claim 4, wherein determining whether the second character string is a refinement of the first character string further comprises determining a minimum number of the edits required to transform the first character string into the second character string.

6. The method of claim 3, further comprising:
retrieving a third record including a third character string and a third indication of time; and
determining that the second character string was a successful search string based on at least one of:
a determination that a difference between the third indication of time and the indication of second time exceeds the predetermined time duration;
a determination that a minimum number of edits required to transform the second character string into the third character string exceeds a predetermined number of edits; and
a number of search results indicated in the second record.

7. The method of claim 1, further comprising normalizing the first character string and the second character string, the normalizing including at least one of:
capitalizing a first character of each word in at least one of the first character string and the second character string;
removing punctuation from at least one of the first character string and the second character string;
removing a space between words in at least one of the first character string and the second character string; and
removing an accent from a character in at least one of the first character string and the second character string.

8. A computer system for identifying failed and successful search queries, comprising:
a memory device that stores a set of instructions; and
at least one processor that executes the set of instructions and is configured to:
retrieve a first record including a first character string;
retrieve a second record including a second character string;
determine that the second character string is a refinement attempted by a user of the first character string;
identify at least a first sequence of characters of the first character string that differs from at least a second sequence of characters of the second character string;
store the first sequence of characters and the second sequence of characters as a pair in a database of stored pairs;
calculate a frequency with which the pair containing the first sequence of characters and the second sequence of characters appears within the database of stored pairs;
determine that the frequency exceeds a predetermined frequency threshold; and
store the pair in a correction log.

9. The computer system of claim 8, the first record further including a first identifier and the second record further including a second identifier, wherein determining that the second character string is a refinement of the first character string further comprises determining that the first identifier matches the second identifier.

10. The computer system of claim 8, the first record further including an indication of a first time and the second record further including an indication of a second time, wherein determining that the second character string is a refinement of the first character string further comprises determining that a difference between the indication of the second time and the indication of the first time is within a predetermined time duration.

11. The computer system of claim 8, wherein a difference between the second sequence of characters and the first sequence of characters comprises at least one of the following edits:
an inserted character;
a deleted character;
a substituted character;
an inserted word;
a deleted word; or
a substituted word.

12. The computer system of claim 11, wherein determining whether the second character string is a refinement of the first character string further comprises determining a minimum number of the edits required to transform the first character string into the second character string.

13. A non-transitory computer-readable medium that stores a set of instructions that, when executed by at least one processor, configures the at least one processor to carry out a method, the method comprising:
retrieving a first record including a first character string;
retrieving a second record including a second character string;
determining that the second character string is a refinement attempted by a user of the first character string;
identifying at least a first sequence of characters of the first character string that differs from at least a second sequence of characters of the second character string;
storing the first sequence of characters and the second sequence of characters as a pair in a database of stored pairs;
calculating a frequency with which the pair containing the first sequence of characters and the second sequence of characters appears within the database of stored pairs;
determining that the frequency exceeds a predetermined frequency threshold; and
storing the pair in a correction log.

14. The computer-readable medium of claim 13, the first record further including a first identifier and the second record further including a second identifier, wherein determining that the second character string is a refinement of the first character string further comprises determining that the first identifier matches the second identifier.

15. The computer-readable medium of claim 13, the first record further including an indication of a first time and the second record further including an indication of a second time, wherein determining that the second character string is a refinement of the first character string further comprises determining that a difference between the indication of the second time and the indication of the first time is within a predetermined time duration.

16. The computer-readable medium of claim 13, wherein a difference between the second sequence of characters and the first sequence of characters comprises at least one of the following edits:
an inserted character;
a deleted character;
a substituted character;
an inserted word;
a deleted word; or
a substituted word.

17. The computer-readable medium of claim 16, wherein determining whether the second character string is a refinement of the first character string further comprises determining a minimum number of the edits required to transform the first character string into the second character string.

* * * * *